United States Patent [19]
Barton, III et al.

[11] Patent Number: 5,761,515
[45] Date of Patent: Jun. 2, 1998

[54] BRANCH ON CACHE HIT/MISS FOR COMPILER-ASSISTED MISS DELAY TOLERANCE

[75] Inventors: Charles Marshall Barton, III, Haworth, N.J.; Pradeep Kumar Dubey, White Plains; Jaime Humberto Moreno, Hartsdale, both of N.Y.

[73] Assignee: International Business Machines Corporation, Armonk, N.Y.

[21] Appl. No.: 616,131

[22] Filed: Mar. 14, 1996

[51] Int. Cl.$^6$ .............................. G06F 9/45; G06F 12/00
[52] U.S. Cl. ................... 395/709; 711/118; 711/122; 711/144
[58] Field of Search ........................... 395/445, 449, 395/481, 427, 561, 566, 580, 581, 583, 376, 708, 709, 100, 471, 444; 711/118, 122, 154, 117, 144

[56] References Cited

U.S. PATENT DOCUMENTS

| | | | |
|---|---|---|---|
| 4,722,071 | 1/1988 | Gates et al. | 395/709 |
| 5,043,870 | 8/1991 | Ditzel et al. | 395/459 |
| 5,175,856 | 12/1992 | Van Dyke et al. | 395/704 |
| 5,193,157 | 3/1993 | Barbour et al. | 395/581 |
| 5,212,794 | 5/1993 | Pettis et al. | 395/709 |
| 5,287,467 | 2/1994 | Blaner et al. | 395/582 |
| 5,303,377 | 4/1994 | Gupta et al. | 395/709 |
| 5,357,618 | 10/1994 | Mirza et al. | 395/403 |
| 5,664,193 | 9/1997 | Tirumalai | 395/705 |

FOREIGN PATENT DOCUMENTS 4-239323  8/1992  Japan.

OTHER PUBLICATIONS

Mark Horowitz et al., "Informing Loads: Enabling Software to Observe and React to Memory Behavior", Stanford University Technical Report CSL-TR-95-673 (also numbered STAN-CS-95-675), Jul. 1995.

*Primary Examiner*—Tod R. Swann
*Assistant Examiner*—Conley B. King, Jr.
*Attorney, Agent, or Firm*—Kevin M. Jordan

[57] ABSTRACT

In a computer system having a hierarchical memory, the problem of tolerating cache miss latency is solved by dynamically switching appropriately between two different code sequences, one optimized at compile-time, assuming a cache-hit, and the other optimized at compile-time, assuming a cache-miss. A method for processing instructions and data in a computer system including a hierarchical memory and a static instruction sequence including a memory access instruction and associated memory access latency specific code sequences, each code sequence optimized dependent on an execution of the memory access instruction causing one of a hit or a miss at a level of the memory hierarchy, includes the steps of: decoding and executing the memory access instruction and storing information indicating whether the execution of the memory access instruction caused the hit or the miss; and branching to a cache hit optimized code sequence when the information indicates the hit and a miss optimized code sequence when the information indicates the miss, responsive to the step of storing. Preferably, the memory access latency specific code sequences are associated with one or more identified critical miss-points. The step of branching may be responsive to an inserted branch instruction associated with the memory access instruction. The branch instruction may also specify a level of the cache memory upon which the step of branching is recommended.

35 Claims, 9 Drawing Sheets

FIG.1

PRIOR ART

FIG.2

| LABEL | INSTRUCTION | LATENCY | CACHE-HIT | CACHE-MISS | COMMENTS |
|---|---|---|---|---|---|
| L: | LOAD R1, mem 1 | 2 | CYCLE 1 | CYCLE 1 | |
| K1: | R12 <- R11 * R10 | 2 | CYCLE 1 | CYCLE 1 | branch-on-miss |
| X1: | mbranch m, 1, KK2 | 1 | CYCLE 1 | CYCLE 1 | hit-sequence |
| K2: | R14 <- R13 * R12 | 2 | CYCLE 3 | | |
| U1: | R3 <- R1 * R2 | 2 | CYCLE 4 | | |
| K3: | R16 <- R15 * R14 | 2 | CYCLE 5 | | |
| U2: | R5 <- R4 * R3 | 2 | CYCLE 6 | | |
| K4: | R18 <- R17+R16 | 1 | CYCLE 7 | | |
| K5: | R20 <- R19 * R18 | 2 | CYCLE 8 | | |
| U3: | R7 <- R6 * R5 | 2 | CYCLE 9 | | |
| K6: | R22 <- R21+R20 | 1 | CYCLE 10 | | |
| KK2: | R14 <- R13 * R12 | 2 | | CYCLE 3 | miss-sequence |
| KK3: | R16 <- R15 * R14 | 2 | | CYCLE 5 | |
| KK4: | R18 <- R17+R16 | 1 | | CYCLE 7 | |
| UU1: | R3 <- R1 * R2 | 2 | | CYCLE 8 | |
| KK5: | R20 <- R19 * R18 | 2 | | CYCLE 9 | |
| UU2: | R5 <- R4 * R3 | 2 | | CYCLE 10 | |
| KK6: | R22 <- R21+R20 | 1 | | CYCLE 11 | |
| UU3: | R7 <- R6 * R5 | 2 | | CYCLE 12 | |

BRANCH ON CACHE HIT/MISS FOR COMPILER-ASSISTED MISS DELAY TOLERANCE

CROSS-REFERENCE TO RELATED APPLICATIONS

The present application is related in subject matter to U.S. co-pending application Ser. No. 08/426,502 (Attorney Docket No. YO995-036) filed Apr. 21, 1995 by Pradeep K. Dubey, commonly assigned to the assignee of the present application, which U.S. application is hereby incorporated herein by reference in its entirety.

FIELD OF THE INVENTION

This invention relates to computer processing units and more particularly, to the compiler-assisted tolerance of delays associated with fetching of instructions and data from a hierarchical memory of the computer processing unit.

BACKGROUND DESCRIPTION

Processor performance has been increasing at approximately 50% per year, while memory access times have been improving at only 5 to 10% per year. As a result, the latency of cache misses in processor cycles is increasing rapidly. Additionally, due to the increase in the required data bandwidth to support higher degrees of instruction-level parallelism, cache miss latencies are becoming a larger fraction of overall processor performance. Therefore, various attempts have been made to be able to reduce and tolerate cache miss latency.

Figure 1:
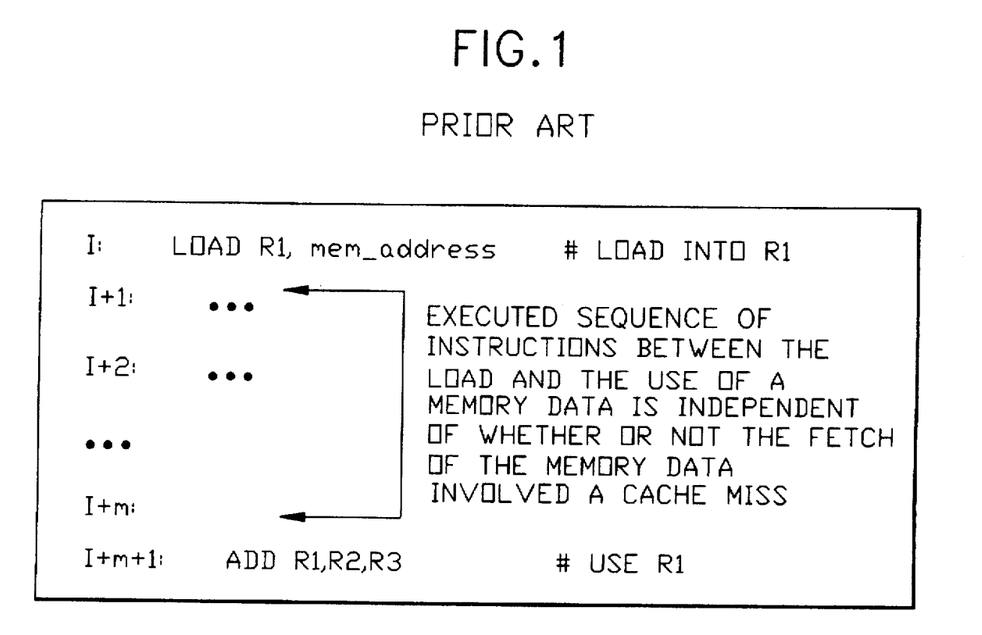
FIG. 1 illustrates a prior art method of introducing instructions between the load and the use of data which are independent of a cache-miss or cache-hit.

Several current microprocessors, such as those sold by the IBM Corporation under the trademark "POWERPC" and those sold by Hewlett-Packard under the trademark, "PA-RISC", offer support for prefetching of a cache block. This support is typically in the form of a compiler-inserted touch instruction which tries to (pre)fetch the identified line into the cache before its original use. Thus, a data cache touch instruction is similar to a load instruction, except it does not cause any error handler to be invoked in the case of an exception. This approach, along with the larger caches in current processors, has been effective to varying extents in reducing cache misses. Still for many applications, especially commercial applications with large data sets, cache-misses continue to dominate the wasted cycles. The potential performance benefit of prefetching is limited due to the following factors. First, prefetching becomes increasingly difficult and less effective, as the cache-miss latency (in terms of processor clock cycles) increases. Note that to start a prefetch, the address associated with the instruction and/or data cache line should be available early enough to carry out the touch. A line fetched very early, however, is more likely to be thrown out of the cache by its replacement algorithm before the line gets used. Moreover, a very early prefetch also runs into the control flow uncertainties of the program. As a result, in spite of the best efforts to reduce cache misses, a high-performance processor must still be designed to tolerate cache-miss latencies. This is the particular problem being addressed by this invention. In the prior art, this problem has been addressed in the following two ways:

1. Delay slots: This approach introduces instructions between the load and the use of the data, which are independent of the data to be loaded. As a result, possible delays in the load (due to a cache miss) can be tolerated. The availability of such instructions determines the extent to which cache miss latency can be tolerated using this approach. This is illustrated in the prior art Sample Code sequence FIG. 1. Instruction I in this figure initiates the load of the data, and instruction I+m+1 contains the use of the loaded data. The intervening instructions I+1 and I+m refer to the instructions independent of the load in instruction I. Note that the executed set of these intermediate instructions is independent of whether or not the load in instruction I has a cache hit or miss. Thus the executed set cannot be uniquely optimized for good performance in the case of both a cache hit and cache miss. In other words, if a compiler is unable to determine a common static sequence having optimal performance in the event of both cache hit and cache miss, it is forced to optimize for either cache hit or cache miss. Thus, a need exists for a method of fetching instructions and data whereby, the executed set of intermediate instructions is dependent on whether or not the load in instruction I has a cache hit or miss. Thus, the executed set will be optimized for good performance in the event of both cache hit and cache miss.

2. Multithreading: This approach addresses the problem of latency tolerance by switching execution to a different execution thread. Note that a thread refers to a sequence of instructions executable using a single instruction sequencing control (implying, single program counter) and a shared set of architecturally visible machine states (e.g., architected registers). Therefore, multithreading requires the ability to support multiple program contexts to enable context-switching between different threads. It further requires detection of such independent threads, which often requires operating system involvement. Thus, a need exists for a method of fetching instructions and data which tolerates cache miss latency in a single-thread context. An embodiment of the present invention addresses latency tolerance in the context of a single thread.

By way of overview, in prior art computer systems, instructions generated by a compiler or assembly language programmer are typically stored sequentially in an instruction memory prior to run time. This sequence is called the static order. A dynamic order is the order in which the computer executes these instructions. The dynamic order may or may not be the same as the static order. In the discussion to follow, the phrase compile time is used to refer to the timing of any prior-to-run-time processing. Note however that although such processing is very likely to be carried out by a compiler, other means, such as assembly level programming, could be employed instead.

The present invention advantageously provides an improved method of fetching instructions and data, across multiple levels of memory hierarchy. Note that such memory hierarchies are well known in prior art and widely in use. Typically such a memory hierarchy of say, M levels, will consist of the smallest (in terms of size) and the fastest (in terms of access time) memory at the lowest level, say Level-1, and progress towards the largest and the slowest memory at the highest, M-th level of the hierarchy. In other words, the memory at some level, say I, is smaller and faster than that at the next level, I+1. Also note that although any item (instruction or data) is certainly available at level M, it takes the longest time to access the item at this level. On the other hand, although a lower level of memory hierarchy typically has faster access time, there is also an increasingly higher probability that the item is missing at lower levels. Therefore, a typical memory access begins with a wait (if any) for the data item from the lowest level. In case of a miss at this level, an additional wait is needed to access the next higher level. In other words, access is attempted at successively higher levels, until the first hit. This further implies that the latency (delay) of the instruction associated with the item fetch can vary widely depending on the memory level at which the item is ultimately found. For example, the access delay for Level-1 memory is typically one processor cycle, whereas, that from the higher levels of memory can be tens or hundreds of processor cycles. The Level-1 memory is typically on-chip, and is often referred to as cache in the discussion to follow.

The knowledge of instruction latencies, where latency refers to the number of cycles for completing the instruction execution, is crucial for many compile-time optimizations, e.g., during code reordering in typical superscalar and super-pipelined machines, and during scheduling in VLIW (Very Long Instruction Word) machines. Superscalar microprocessors are well known in the art. See e.g., *Supeiscalar Microprocessor Design*, by Mike Johnson, Prentice Hall (1991).

Consider, for example, the code sequences in the following Tables and accompanying Figures. The cycle number shown refers to the expected cycle of completion of the instruction for a hypothetical target superscalar processor. This processor consists of an integer unit, a load/store unit, and a branch unit. Instructions are issued in order and the issue is blocked on the first instruction that does not have its source operands ready to be issued. Up to three instructions (one integer, one load/store, and one branch) can be issued in one cycle. Further assume the load instruction latency is two cycles during a cache hit and seven cycles during a cache miss.

Consider for example, the unoptimized code sequence of Table 1a which, as illustrated, will take 16 cycles assuming a cache-hit for the load instruction at Label L. In case of a cache-miss, the sequence takes 21 cycles. Let the sequence of instructions at labels K1 through K6 be referred to as the K-thread and the remaining instructions be referred to as the U-thread.

TABLE 1a

Unoptimized static instruction sequence

| Label | Instruction | Latency | Cache-hit | Cache-miss | Comments |
|---|---|---|---|---|---|
| K1: | R12 <− R11 * R10 | 2 | Cycle 1 | Cycle 1 | |
| K2: | R14 <− R13 * R12 | 2 | Cycle 3 | Cycle 3 | |
| K3: | R16 <− R15 * R14 | 2 | Cycle 5 | Cycle 5 | |
| K4: | R18 <− R17 + R16 | 1 | Cycle 7 | Cycle 7 | K-Thread |
| K5: | R20 <− R19 * R18 | 2 | Cycle 8 | Cycle 8 | |
| K6: | R22 <− R21 + R20 | 1 | Cycle 10 | Cycle 10 | |
| L: | Load R1, mem1 | 2/7 | Cycle 10 | Cycle 10 | |
| U1: | R3 <− R1 * R2 | 2 | Cycle 12 | Cycle 17 | |
| U2: | R5 <− R4 * R3 | 2 | Cycle 14 | Cycle 19 | U-Thread |
| U3: | R7 <− R6 * R5 | 2 | Cycle 16 | Cycle 21 | |

Note: No compile-time interleaving of K and U threads

Now consider Table 1b, below, which illustrates an exemplary cache-hit optimized code sequence which interleaves instructions from the K and the U threads of Table 1a. Proper interleaving of two threads often requires the knowledge of instruction latencies to determine the more critical (longer overall latency) thread which is given priority over the less critical thread during resource contention. For example the instructions at labels K2 and U1 are both ready to be issued to the (single) integer unit in the third cycle and hence implying a resource contention. Assuming a cache-hit for the load instruction, the compiler determines that the remaining K-thread (K2–K6) has a longer overall latency than the remaining U-thread (U1–U3). Therefore, during this resource contention, the instruction from the K-thread will be given priority over that from the U-thread. The instruction at label U1 is thus deferred to follow the instruction at label K2 in the compile-time code ordering. Similarly, the instructions at labels K5 and U3 are both ready to be issued to the (single) execution unit in cycle 8. Since the overall latency of the remaining K-thread (K5–K6) is more than that of the remaining U-thread (U3), the K-thread is again given priority and the instruction at label U3 is deferred to follow the instruction at label K5. The resulting cache-hit optimized sequence shown takes 10 cycles during cache-hit but takes 14 cycles during a cache-miss.

TABLE 1b

Static instruction sequence optimized for cache hit

| Label | Instruction | Latency | Cache-hit | Cache-miss | Comments |
|---|---|---|---|---|---|
| L: | Load R1, mem1 | 2/7 | Cycle 1 | Cycle 1 | |
| K1: | R12 <− R11 * R10 | 2 | Cycle 1 | Cycle 1 | |
| K2: | R14 <− R13 * R12 | 2 | Cycle 3 | Cycle 3 | U1 deferred |
| U1: | R3 <− R1 * R2 | 2 | Cycle 4 | Cycle 8 | |
| K3: | R16 <− R15 * R14 | 2 | Cycle 5 | Cycle 9 | |
| U2: | R5 <− R4 * R3 | 2 | Cycle 6 | Cycle 10 | |
| K4: | R18 <− R17 + R16 | 1 | Cycle 7 | Cycle 11 | |
| K5: | R20 <− R19 * R18 | 2 | Cycle 8 | Cycle 12 | U3 deferred |
| U3: | R7 <− R6 * R5 | 2 | Cycle 9 | Cycle 13 | |
| K6: | R22 <− R21 + R20 | 1 | Cycle 10 | Cycle 14 | |

Note: Assuming a cache-hit for instruction L, the K-thread is on the critical path. Therefore, assumed ready instructions from the K-thread are given priority by the compiler, over those of the U-thread. This results in an optimal sequence during a cache-hit but a sub-optimal sequence during cache-miss.

Alternatively, the compiler can assume a cache miss for the "Load" instruction to generate the cache-miss optimized sequence illustrated in Table 1c, below. Now, consider the resource contention in cycle 8, when both instructions at labels U 1 and KS are ready to be issued to the (single) integer unit. Since the latency of the remaining U-thread (U1-U3) is greater than that of the remaining K-thread (K5–K6), unlike the case in Table 1b, the U-thread is given priority over the K-thread. As a result, the instruction at labels K5 is deferred to follow that at label U3. The resulting sequence takes fewer cycles (12 cycles) to execute during cache-miss than the sequence in Table 1b (14 cycles). Conversely, this sequence takes longer to execute (12 cycles) during a cache hit than the Table 1b (cache hit optimized) sequence (10 cycles).

TABLE 1c

Static instruction sequence optimized for cache miss

| Label | Instruction | Latency | Cache-hit | Cache-miss | Comments |
|---|---|---|---|---|---|
| L: | Load R1, mem1 | 2 | Cycle 1 | Cycle 1 | |
| K1: | R12 <− R11 * R10 | 2 | Cycle 1 | Cycle 1 | |
| X1: | mbranch m, 1, KK2 | 1 | Cycle 1 | Cycle 1 | branch-on-miss |
| K2: | R14 <− R13 * R12 | 2 | Cycle 3 | | hit-sequence |
| U1: | R3 <− R1 * R2 | 2 | Cycle 4 | | |
| K3: | R16 <− R15 * R14 | 2 | Cycle 5 | | |
| U2: | R5 <− R4 * R3 | 2 | Cycle 6 | | |
| K4: | R18 <− R17 + R16 | 1 | Cycle 7 | | |
| K5: | R20 <− R19 * R18 | 2 | Cycle 8 | | |
| U3: | R7 <− R6 * R5 | 2 | Cycle 9 | | |
| K6: | R22 <− R21 + R20 | 1 | Cycle 10 | | |
| KK2: | R14 <− R13 * R12 | 2 | Cycle 3 | | miss-sequence |

TABLE 1c-continued

Static instruction sequence optimized for cache miss

| Label | Instruction | Latency | Cache-hit | Cache-miss | Comments |
|---|---|---|---|---|---|
| KK3: | R16 <- R15 * R14 | 2 | Cycle 5 | | |
| KK4: | R18 <- R17 + R16 | 1 | Cycle 7 | | |
| UU1: | R3 <- R1 * R2 | 2 | Cycle 8 | | |
| KK5: | R20 <- R19 * R18 | 2 | Cycle 9 | | |
| UU2: | R5 <- R4 * R3 | 2 | Cycle 10 | | |
| KK6: | R22 <- R21 + R20 | 1 | Cycle 11 | | |
| UU3: | R7 <- R6 * R5 | 2 | Cycle 12 | | |

Note: Two different code sequences are generated at compile-time, one optimized assuming a cache hit for the load instruction L, and the other assuming a cache miss. Using the branch-on-miss instruction proposed in this invention, the optimal of the two sequences is chosen at run-time, both during cache hit and miss.

On prior-art machines, the compiler will have to choose between one of the two sequences (those of Tables 1b and 1c) depending on whether the load is a priori assumed more likely to hit or miss at run-time. In other words, only one of the two sequences will be generated. As noted, if the compiler chooses to generate the sequence in Table 1b, performance will be sub-optimal in run-time instances which cause a cache-miss for the load. Conversely, if the compiler chooses to generate the sequence in Table 1c, performance will be sub-optimal in run-time instances which cause a cache-hit for the load. Those skilled in the art will appreciate that it is very difficult to correctly predict at compile-time, whether or not a specific item will be present in a specific lower level of memory hierarchy, at run-time. Therefore, the performance may further suffer in case of a poor compile-time prediction.

OBJECT OF THE INVENTION

Accordingly, an object of this invention is to provide an improved method of fetching instructions and data, across multiple levels of memory hierarchy.

A further object of this invention is to provide an improved method of fetching instructions and data, across multiple levels of memory hierarchy, via compile-time optimizations to improve performance both in the cases of hits as well as misses at different levels of memory hierarchy. Additional objects and advantages of the invention will become apparent in light of the description which follows, and in part will be obvious from the description, or may be learned by practice of the invention.

SUMMARY

To achieve the objects in accordance with the purposes of the present invention, as embodied and described herein, a version of a computer processing unit according to the present invention solves the problem of tolerating cache miss latency by dynamically switching appropriately between two different code sequences, one optimized at compile-time, assuming a cache-hit, and the other optimized at compile-time, assuming a cache-miss.

A preferred embodiment of a computer-implemented method according to the present invention for generating memory access latency specific code sequences optimized for execution on a computer system having a hierarchical memory, comprises the steps of: identifying a memory access instruction in a static code sequence; generating a first memory access latency code sequence associated with the memory access instruction optimized for a hit at a level of the hierarchical memory and a second memory access latency code sequence associated with the memory access instruction optimized for a miss at the level of the hierarchical memory; and inserting an instruction for executing the first memory access latency specific code sequence when an execution of the memory access instruction causes the hit and the second memory access latency specific code sequences when an execution of the memory access instruction causes the miss.

A preferred embodiment of a compile-time optimized method according to the present invention for processing instructions and data in a computer system including a hierarchical memory, includes the steps of: generating a static instruction sequence including a memory access instruction and associated memory access latency specific code sequences, each code sequence optimized dependent on an execution of the memory access instruction causing one of a hit or a miss at a level of the memory hierarchy; decoding and executing the memory access instruction and storing information indicating whether the execution of the memory access instruction caused the hit or the miss; and branching to a cache hit optimized code sequence when the information indicates the hit and a miss optimized code sequence when the information indicates the miss, responsive to the step of storing.

BRIEF DESCRIPTION OF THE INVENTION

These and other features, aspects, and advantages of the present invention will become better understood with regard to the following description, appended claims, and accompanying drawings wherein:

DETAILED DESCRIPTION

Figure 2:
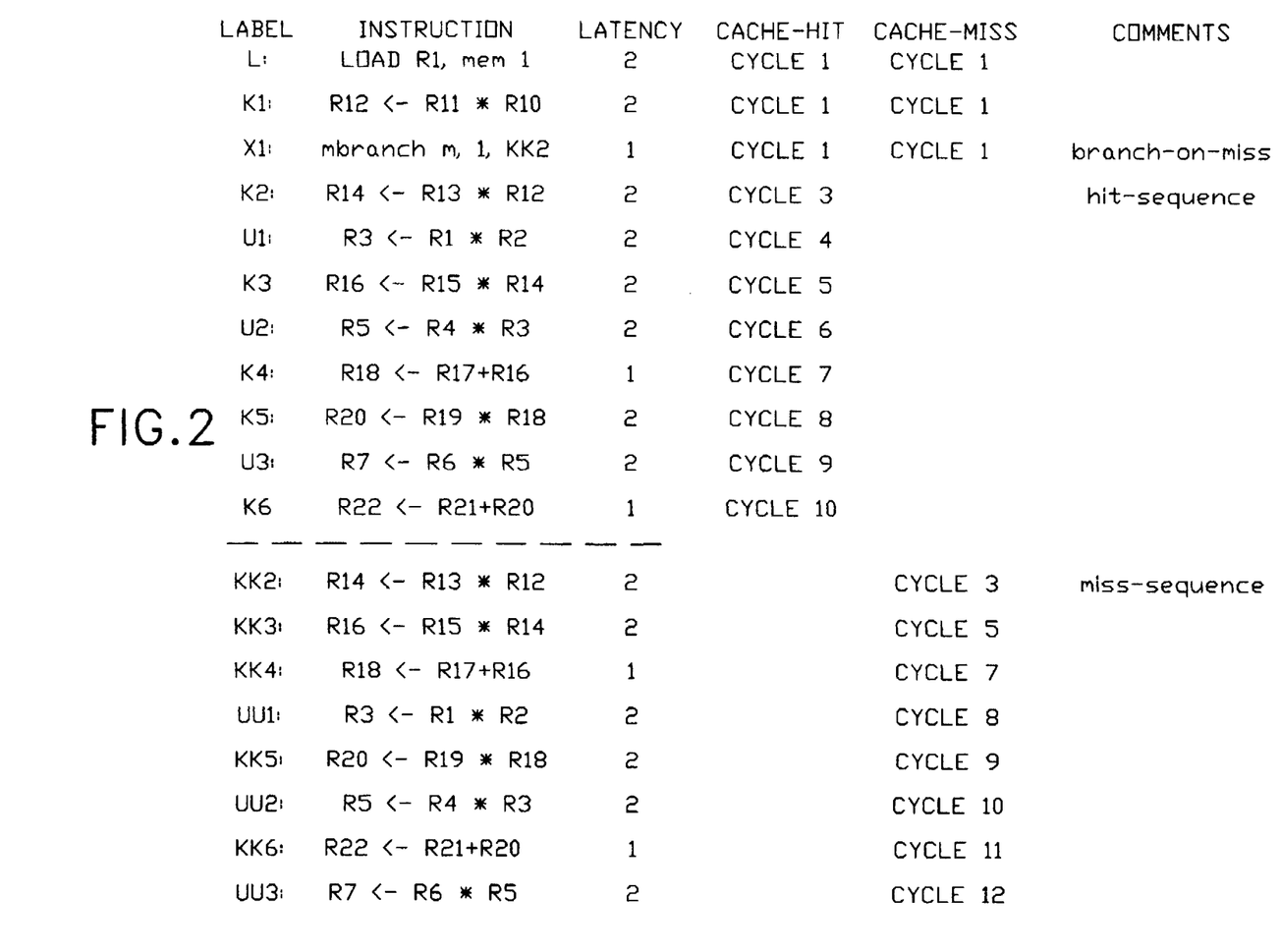
FIG. 2 illustrates a program sequence including a version of the MBRANCH instruction according to the present invention for dynamically switching execution between code sequences optimized for both cache hit and miss.

An embodiment of the present invention proposes a new instruction which may be referred to as the branch-on-miss instruction, or the MBRANCH instruction. This instruction provides run-time ability to branch to alternate code sequences depending on whether or not there is a cache hit or miss. Referring now to FIG. 2, this MBRANCH is encoded at label X1, as mibiarch M, 1, KK2. Meaning, in case of a miss (m) at (Level-)1 of memory hierarchy, branch to the label KK2. This advantageously enables the compiler to generate two sequences, one optimized assuming cache-hit, and the other optimized assuming cache-miss. The cachehit-optimized-sequence (from Table 1b), is generated in the fall-through path (labels K2→K6) of the branch-on-miss instruction, and the cache-miss-optimized-sequence (from Table 1c), is generated in the taken path (labels KK2→UU3) of the branch-on-miss instruction. As a result, the run-time performance is now optimal 'both' during cache hit and miss, and the performance is further insensitive to the accuracy of compile-time prediction of cache hit or miss. The details of an embodiment of the semantics of the MBRANCH instruction according to the present invention and the operation of a computer processing system capable of executing the MBRANCH instruction follow. Note that it may be possible to encode the functionality of this instruction in an existing architecture using unused encodings of an existing instruction op-code, e.g., as a variant of an existing conditional-branch instruction.

A preferred embodiment of the present invention also proposes a set of one or more registers, each referred to as a cache record register. Each such register preferably consists of one or more fields, each of which is associated with a specific unique level of memory hierarchy. The field encodes the status of the memory access at the associated level. The default or initial setting for the field values may indicate a hit at that level. Those skilled in the art will appreciate that where a machine architectures has enough reserved bits in more or more existing architected registers, the functionality of the cache record register can be added using those existing reserved bits, without adding any new explicit register to the architected machine state. Otherwise, in case of other machine architectures without enough available register bits, additional architecturally visible registers may be added to support the functionality of a cache record register set.

Detailed Description of MBRANCH Instruction

In a preferred embodiment, the MBRANCH instruction of the present invention is a hint that if there is a cache miss at the identified level of memory hierarchy, performance will probably be improved if the instruction sequence associated with the identified target address are fetched and executed instead of the sequence immediately following the MBRANCH instruction in the static order. Note that this instruction is merely a hint, and thus a given machine implementation is free to ignore this instruction, disregard its semantics and continue to fetch sequentially irrespective of a cache hit or miss. Therefore, the correctness of the program does not depend on whether the semantics of this instruction are observed or ignored. Rather, the performance of the program execution is potentially a function of whether or not the semantics associated with this instruction are observed.

Figure 3:
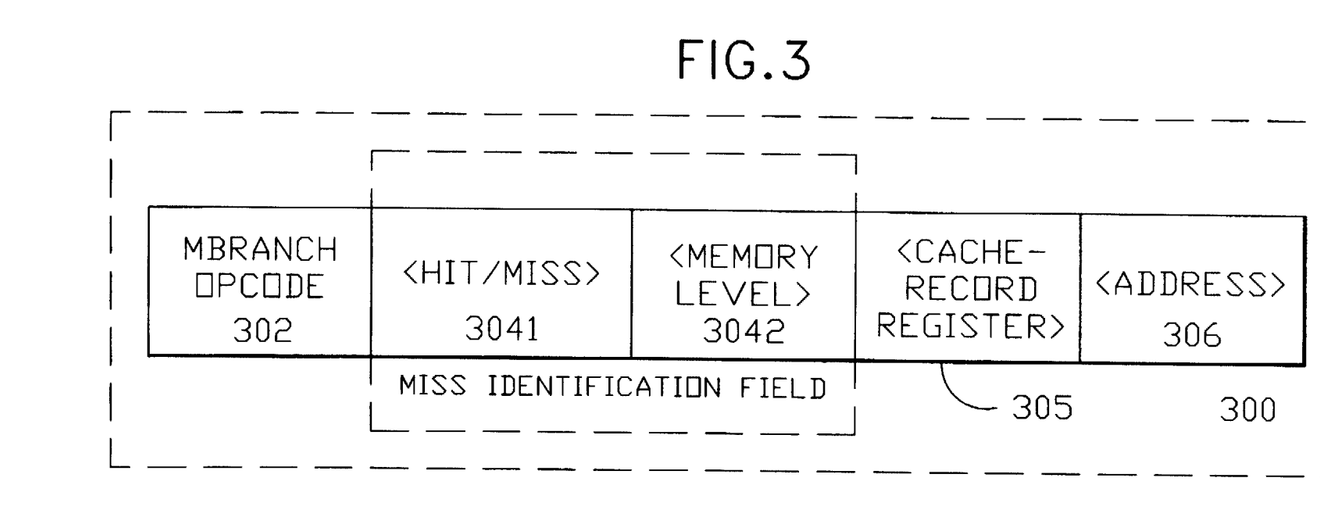
FIG. 3 illustrates a version an MBRANCH instruction proposed in the present invention.

Referring now to FIG. 3 an embodiment of an MBRANCH instruction 300 format according to the present invention is shown including an MBRANCH op-code field 302, a miss identification field 304, a cache-record register field 305, and an address field 306. The address field 306 unambiguously identifies the address of an instruction sequence. The miss identification field 304 specifies the memory access level miss or hit upon which the change of instruction fetch and execution is recommended to branch to the identified instruction address. In an extreme case, the miss identification field 304 may not offer any choice, and hence its semantics can be implied by the op-code field 302, and there may be no need for an explicit miss identification field. However, in a general case, the miss identification field 304 can advantageously encode one of several choices for miss specification. The preferred embodiment of the present invention splits the miss identification field 304 into two sub-fields. The hit/miss subfield 3041 identifies whether the branch is to be taken upon detection of a cache miss or hit. This could be further extended to include the option of hit/miss detection pending. The second subfield, i.e., memory level 3042 specifies the hierarchical memory level at which the hit or miss is to be detected. If the memory level specified is higher than the highest memory level supported in an implementation, the access may be assumed to always be a hit. The cache record register field 305, specifies the cache record register (described later) to be checked to determine the identified memory hit/miss status. Note that this field 305 is unnecessary in the case of just one cache record register.

Detailed Description of a Modified Memory Access Instruction

Figure 4:
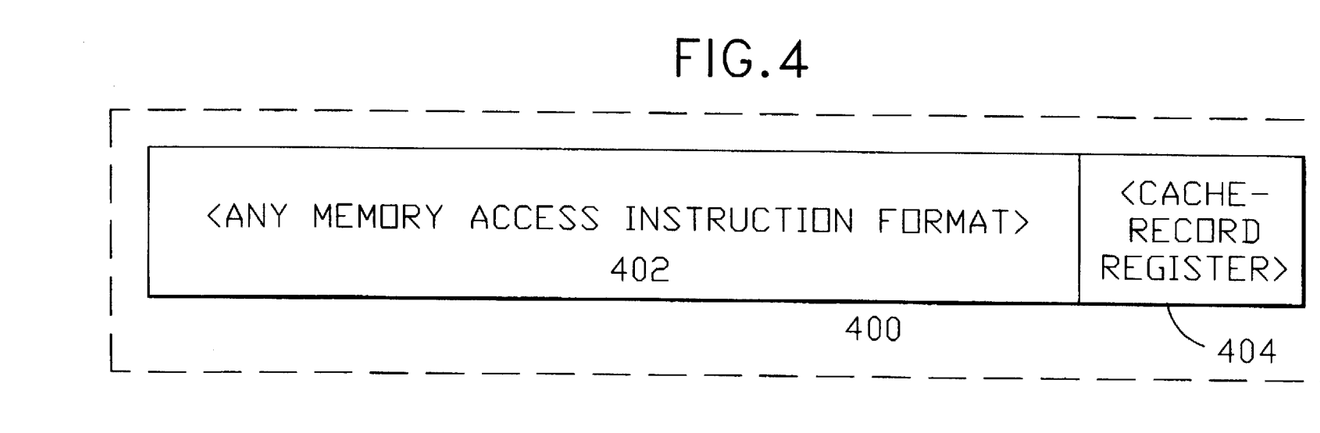
FIG. 4 illustrates a version of a memory access instruction modified according to the present invention.

Any instruction involving one (or more) memory access (es), for example a load instruction, a store instruction, or a touch instruction, is referred to as a memory access instruction. FIG. 4 illustrates a modified format of a memory access instruction 400 according to the present invention. As shown in FIG. 4, the existing format 402 of any memory access instruction may be modified to include a cache-record register field 404 which contains identification of one (or more) of the cache record registers. Again, note that subfield 404 is unnecessary in the case of a single cache record register. The identified register(s) may then be used at run-time to record the status of the associated memory access(es). For example, during the execution of memory access instruction 400, a miss at lower levels, say, at Level-I and Level-2, may be recorded by setting the subfields associated with Levels 1 and 2, in the register identified by the instruction.

Detailed Description of The Computing Apparatus

Figure 5:
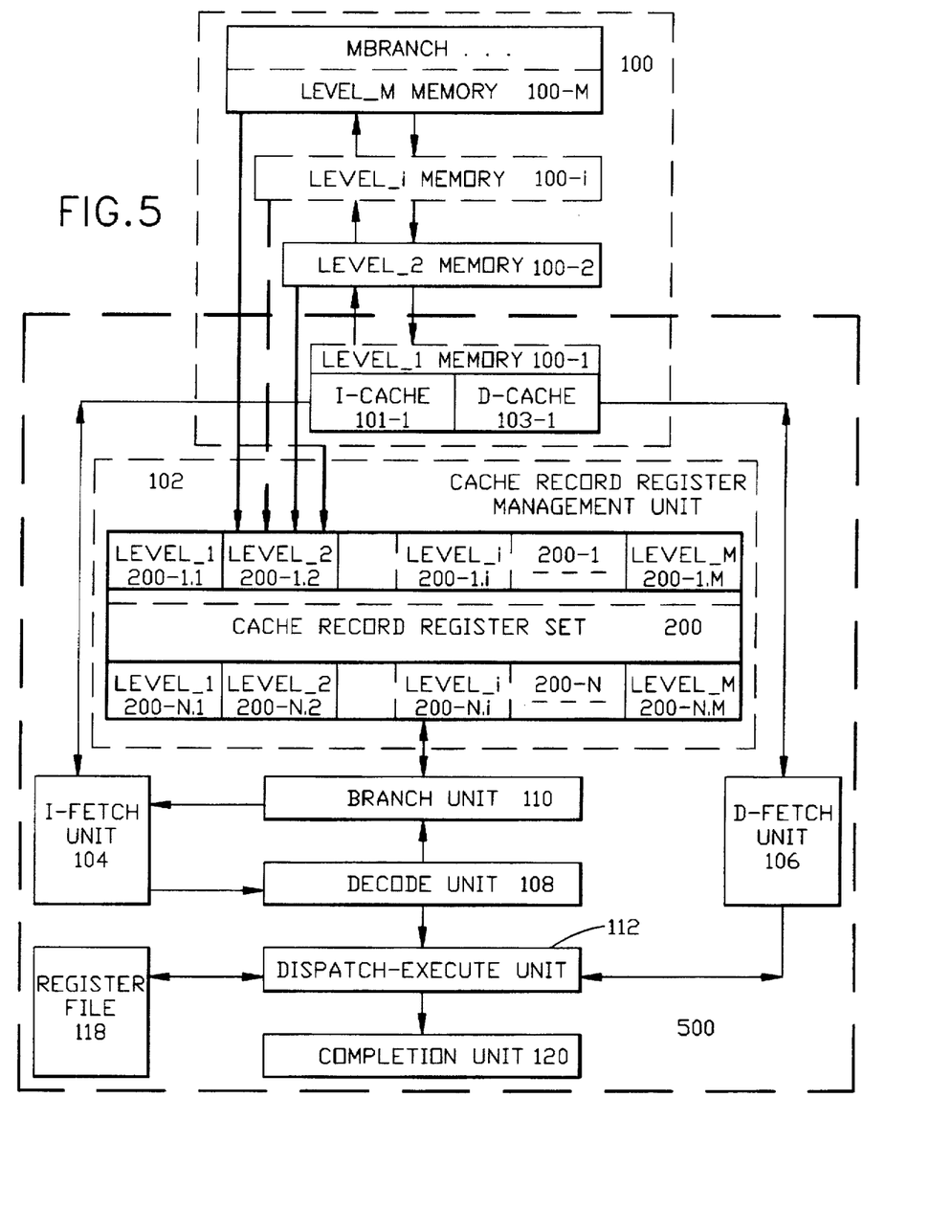
FIG. 5 is a block diagram of a version of a computer system according to the present invention.

FIG. 5 is a block diagram of a computer system including multiple levels of hierarchical memory executing the improved method of fetching instructions and data according to the present invention. The computer processing system shown includes a processor unit 500 and an associated memory unit 100. The memory unit 100 holds program data and instructions intended for execution on the processor unit 500. The memory unit consists of one or more levels of memory hierarchy 100-1, 100-2, 100-i, ... 100-M where M represents the highest level, i.e., main storage. The smallest (in terms of size) and the fastest (in terms of access time) memory level is typically referred to as cache and is incorporated on processor 500 at the lowest level, Level-1 100-1. The successive memory levels are each larger and slower than the preceding lower memory level. In other words, the memory at some level, say i, is smaller and faster than that at the next level, i+1. Although any item (instruction or data) is available at the highest (main storage) level, Level-M, frequently used instruction and data portions of the memory unit are typically kept in an instruction cache unit 101-1 and a data cache unit 103-1, respectively. Alternatively, the instruction and data caches can be merged into a single unified cache. The higher level memory units may also be split into instruction and data units, or kept unified.

As is conventional, the instructions/data stored in the instruction cache 101-1 and data cache 103-1, respectively, are divided into lines or blocks. An instruction fetch unit 104 fetches one or more blocks of instructions stored in the instruction cache 101-1 into the decode unit 108. The decode unit 108 forwards the branch, MBRANCH, and condition register update instructions to a branch unit 110 for execution, and forwards other sequential (non-branch) instructions to a dispatch-execute unit 112. The dispatch-execute unit 112 analyses dependencies among pending instructions, and schedules execution of instructions on one or more functional units. Such a dispatch-execute unit 112, with various implementation tradeoffs, is well known in the prior art. See e.g., *Superscalar Microprocessor Design*, by Mike Johnson, Prentice Hall (1991). Implementation alternatives range from complicated inter-instruction dependence analysis hardware to a very simple dispatch-execute engine with no run-time dependence analysis. In the latter case, the dependence analysis is solely a compile-time responsibility, as in many VLIW (Very Long Instruction Word) machines.

Figure 5A:
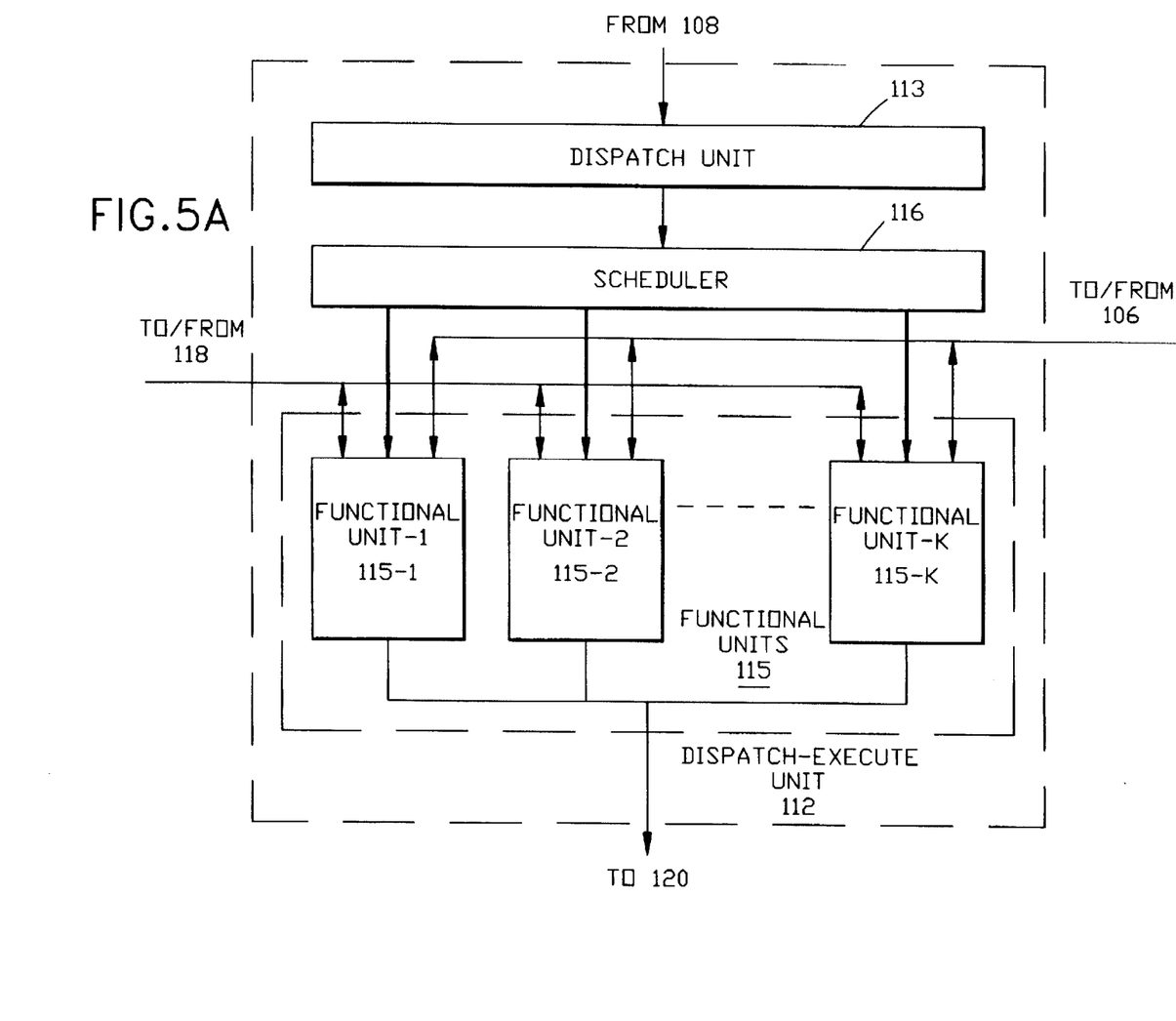
FIG. 5a is a block diagram of a version of the dispatch-execute shown in FIG. 5.

In the preferred embodiment illustrated in FIG. 5a, the dispatch-execute unit 112 consists of a dispatch unit 113, a plurality of functional units 115-1 ... 115-K, and a scheduler 116. The dispatch unit 113 analyzes the dependencies among the instructions forwarded by the decode unit 108, and forwards these instructions to the scheduler 116. All the instructions received by the scheduler in the same cycle may be assumed independent of each other. Such a scheduler 116 is also well known in the prior art for superscalar machines. The scheduler 116 then schedules the instructions on to the functional units 115. The bank consists of one or more functional units 1 15-1 through 115-K, where each unit is capable of executing some or all types of instructions. The functional units 115 receive input source operands from and write the output results to the register file 118 or the data cache 103-1 through the D-fetch unit 106. In the preferred embodiment illustrated in FIG. 5a, all the functional units are identical and hence capable of executing any instruction. Alternatively, the functional units in the bank may be asymmetric. Here, a specific functional unit may be capable of executing only a subset of instructions, e.g., the load/store instructions, or the integer instructions, or the floating-point instructions. As is conventional, the scheduler needs to be aware of any such asymmetry and schedule the instructions appropriately.

A D-Fetch unit 106 handles fetching of blocks of data from the data cache 103-1 into the functional units of the dispatch-execute unit 112. The data cache unit 103-1 typically holds data values used as source operands by the instructions and the data values generated by executed instructions.

The processor unit 500 also includes a register file 1 18 containing a set of registers. The register file 118 provides operands to the functional units associated with the dispatch-execute unit 112 for executing instructions and also receives results of the execution. This register set is further broken down into architecturally visible set of registers and architecturally invisible registers. Architecturally visible, or architected registers refer to the fixed set of registers that are accessible to the assembly level programmer (or the compiler) of the machine. Such a register file 118 is well known in the prior art. The processing unit also includes a completion unit 120 responsible for completing instruction execution in an order considered valid by the architecture. Even though the dispatch-execute unit 112 may dispatch and execute instructions out-of-order, the processor unit 500 may or may not be allowed to complete the instruction in the same order, depending on the architectural constraints.

The branch unit 110 is responsible for implementing the semantics of branch instructions, namely the instructions which can potentially alter the sequential control flow of the machine. The branch unit 10 may also predict unresolved branches, and determine the validity of each prediction upon branch resolution. The branch unit 110 may also include a condition register (CR) which is used for evaluating the outcome of conditional branch instructions, and logic that updates the condition register according to the results of operations performed by the dispatch-execute unit 112.

According to an embodiment of the present invention, the I-Fetch Unit fetches an MBRANCH instruction (described as above) stored in the instruction cache unit 101-1 and forwards it to the decode unit 108. The decode unit 108 identifies the MBRANCH instruction and forwards it to the branch unit 110. To determine the validity of the condition associated with the MBRANCH instruction, the branch unit 110 logic interrogates a cache record register management unit 102 for the value of the cache record register field 3043 identified in the miss identification field 304 of the MBRANCH instruction encoding. The validity of the condition in turn determines whether or not the branch will taken. The cache record register management unit 102 is responsible for managing any reads or writes to the one or more cache record registers, 200-1 through 200-N, in a cache record register set 200. The cache record register set 200 is primarily responsible for implementing the semantics of the MBRANCH instruction according to the present invention. Each register of the cache record register set 200 contains respective sub-fields 200-1.1 . . . 200-1.M and 200-N.1 . . . 200-N.M, where each sub-field may be uniquely associated with a specific memory level 100-1 . . . 100-M of the memory hierarchy 100. Execution of a memory access instruction preferably begins with the initialization of the sub-fields of the appropriate cache record register to a default setting. As the instruction execution proceeds, it may result in updates of the default settings of the cache record register fields, depending on hits or misses at the different levels of the memory hierarchy 100. For example, a miss at Level_1 100-1 and Level_2 100-2 of the memory hierarchy 100 followed by a hit at Level_3 may be consecutively recorded in the corresponding subfields of the appropriate cache record register 200-1 to indicate by setting the sub-fields 200-1.1 . . . 200-1.2 which correspond to Level_1 and Level_2 and by resetting the subfield 200-1.3 corresponding to Level_3. In another embodiment, the cache record register set 200 could be made part of the register file 118. The cache record registers could then be read and updated similar to any other register in the register file 118, as part of the semantics of the MBRANCH and memory access instructions respectively. In yet another embodiment, the cache record register set 200 could be made part of the Branch unit 110 and updated/managed similarly to the condition register included therein.

Detailed Description of a Method of Execution

Figure 6:
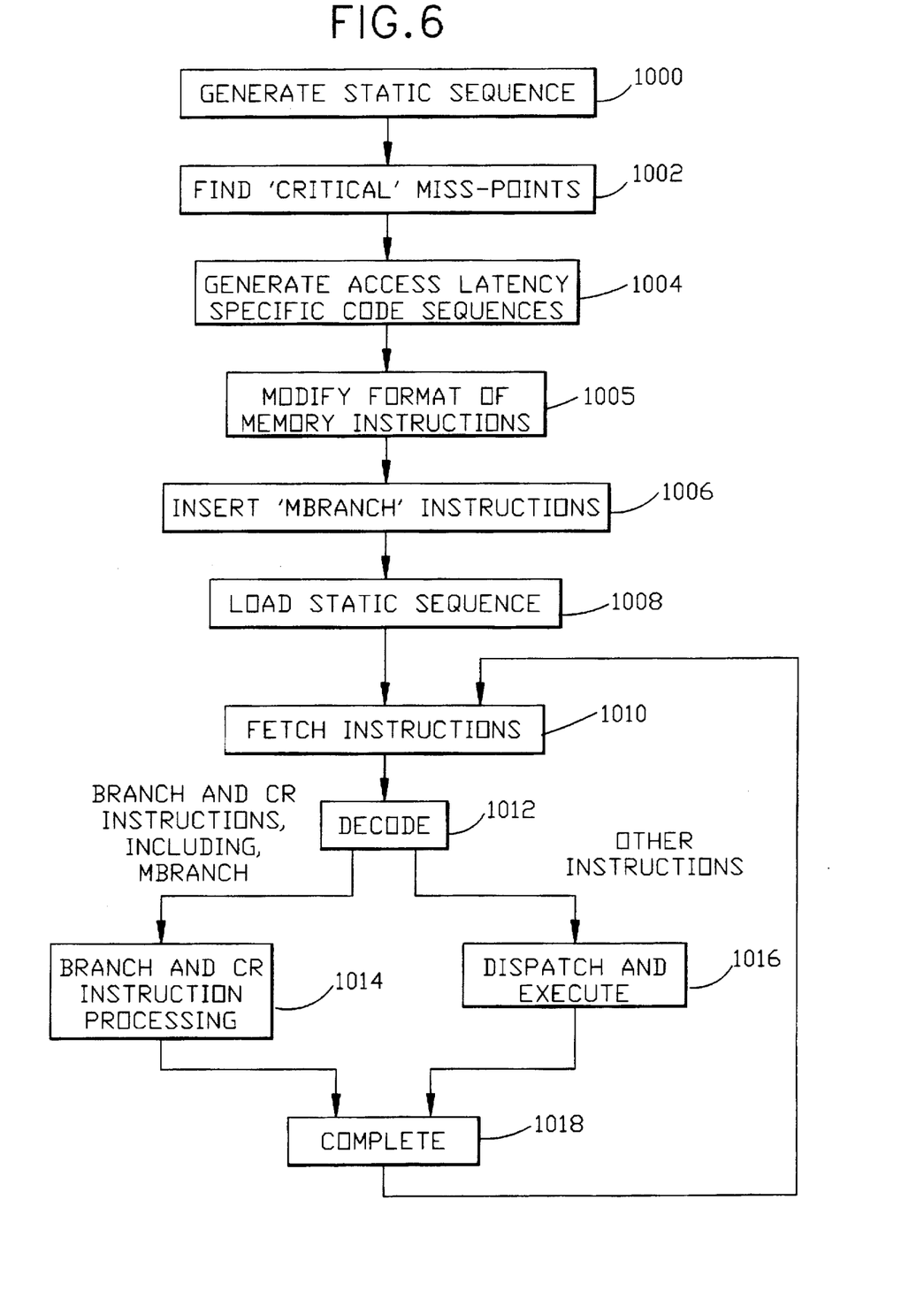
FIG. 6 illustrates a flow chart describing a version of a proposed method of execution, using the computing system shown in FIG. 5.

FIG. 6 illustrates a flow chart describing a version of a method of processing the MBRANCH instruction using the computing system shown in FIG. 5. In step 1000, at compile time, the compiler generates a static sequence of instructions, without any regard to MBRANCH instructions described above. For the sake of clarity of description, during the discussion below, unless otherwise indicated, cache refers only to the data cache 103-1. However, the method described below is also applicable to optimizing instruction cache 101-1 access performance. In step 1002, the compiler analyzes the static sequence to identify specific locations having significant performance enhancement potential if cache access time is optimized. These locations are referred to as 'critical' miss points. In step 1004, for each 'critical' miss point identified, the compiler considers a set of cache access latencies that can possibly result from this data access. For each of these possible cache access latencies, the compiler generates a corresponding optimized code sequence.

Note that a cache access latency refers to the time it takes to retrieve data from the cache. The cache access latency is a function of the level 100-1 through 100-M in the memory unit 100 the data is found. Recall that an embodiment the access process has been explained earlier with reference to FIG. 5.

Figure 7:
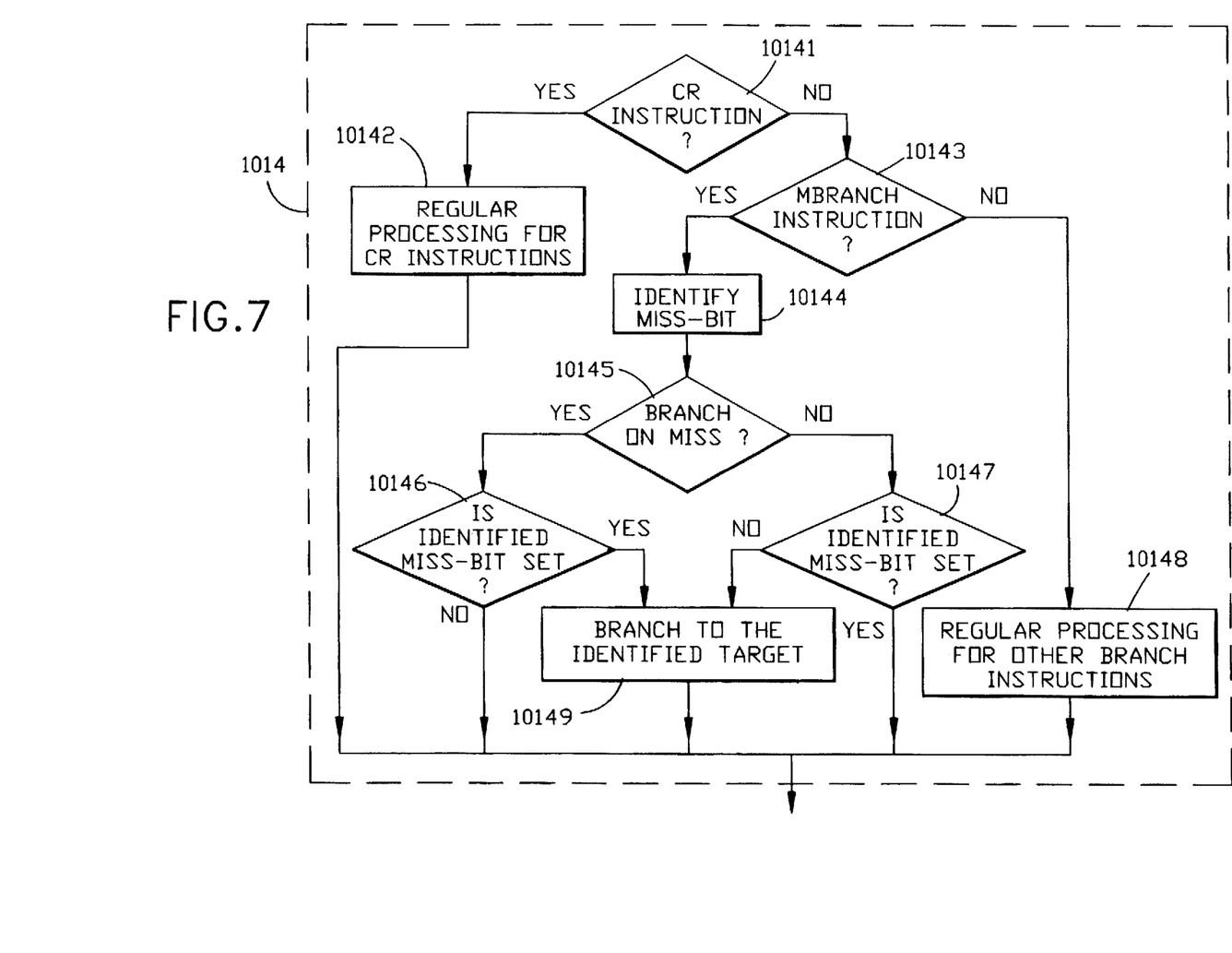
FIG. 7 illustrates the substeps associated with the MBRANCH and condition register (CR) instruction processing step of FIG. 6.
Figure 8:
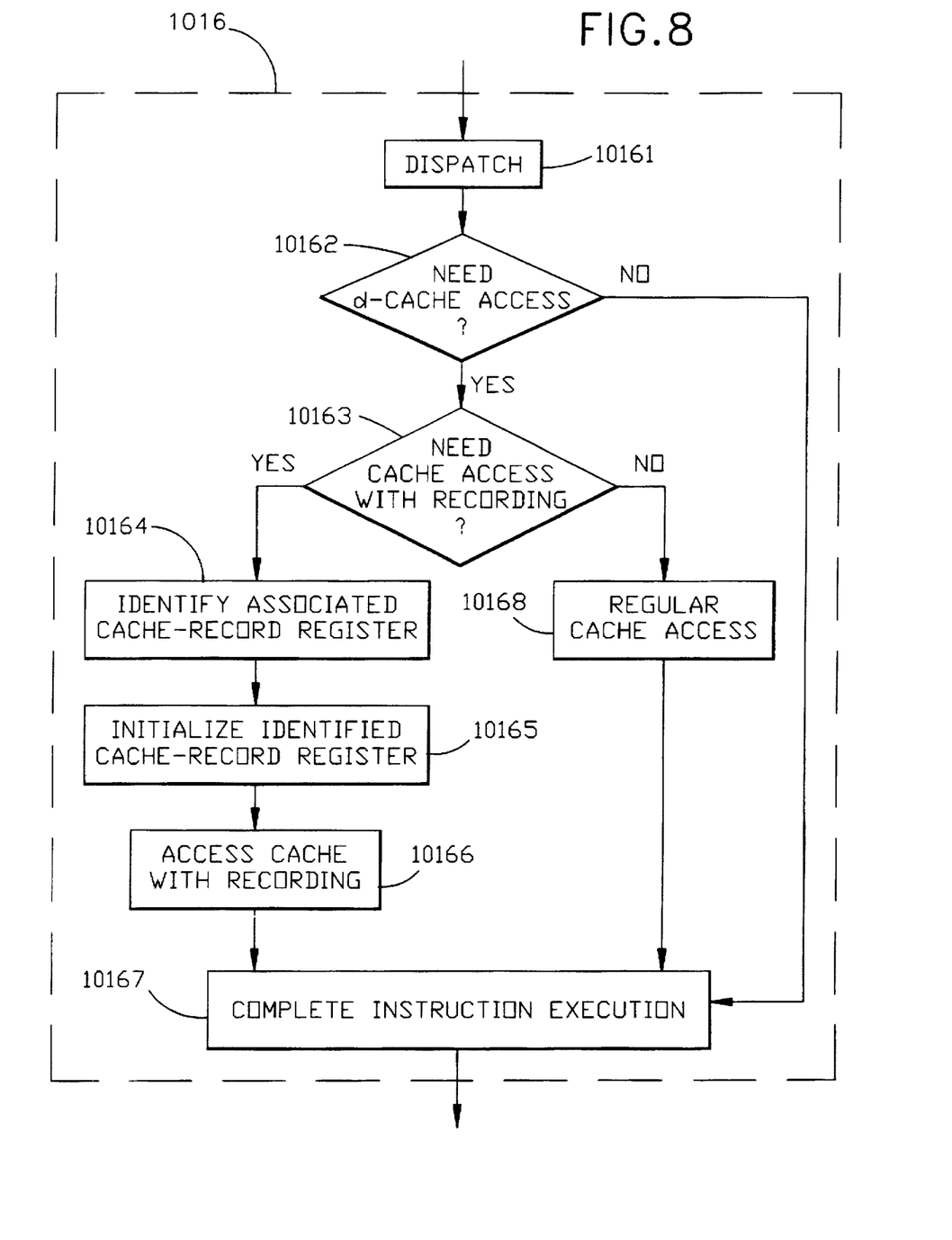
FIG. 8 illustrates the substeps associated with the Dispatch and Execute step of FIG. 6.

Returning to FIG. 6, in step 1005, the memory access instruction associated with the 'critical' miss point is modified to identify a register which at run time may be used to record the results of the associated memory access. A version of the present invention showing such a modified memory instruction was described previously with reference to FIG. 4. In step 1006, the compiler inserts an MBRANCH instruction to branch to the specific optimized code sequence generated in step 1004, corresponding to access outcomes at different levels of the memory hierarchy during the execution of the associated memory access instruction. In step 1008, at run time, the computer processing system loads the compiled static sequence of instructions, including the MBRANCH instructions inserted into the static sequence in step 1006, into the memory 100. Recall that the memory 100 is a multiple level hierarchy 100-1 through 100-M which includes the lowest level instruction cache 101-1. As is conventional, sub-sequences of the static sequence stored in the higher levels of memory 100 are frequently transferred to the lower levels, and finally to the lowest level instruction cache 101-1 for execution. In step 1010, the I-Fetch unit 104 fetches the next instruction sequence from the instruction cache 101-1 by addressing the instruction cache 101-1. If the instruction sequence is missing from the instruction cache 101-1, it is fetched from the higher levels of memory hierarchy 100, as described above. The instruction sequence fetched by the I-Fetch unit 104 is transferred to the decode unit 108. In step 1012, the decode unit 108 decodes one or more instructions simultaneously. Instructions decoded as branch instructions, including MBRANCH instructions, or those involving condition register updates, are forwarded to the branch unit 110. Other instructions, including the modified (in step 1006) format memory access instructions, are forwarded to the dispatch-execute unit 112 for dependence analysis, dispatch, and execution. In step 1014, the branch unit 110 processes instructions decoded as branch instructions, including the MBRANCH instructions of the present invention, or those involving condition register updates. A more detailed description of step 1014 is shown in FIG. 7. In step 1016, the dispatch-execute unit 112 processes instructions other than the branch and condition register update instructions, including the modified format memory access instructions of the present invention. A more detailed description of step 1016 is shown in FIG. 8. Finally, in step 1018, the completion unit 114 completes instruction execution in an order considered a valid order by the architecture as described above. The processing continues to step 1010 to fetch the next instruction sequence from the instruction cache 101-1 and the process repeats for the duration of the program execution.

Recall that in step 1012, the decode unit 108 decodes one or more instructions simultaneously. Decoded branch instructions, including the MBRANCH instruction of the present invention, or those involving condition register updates, are forwarded to the branch unit 110 for processing in step 1014.

Referring now to FIG. 7, a method for processing step 1014 of FIG. 6, is now described. In step 10141, the branch unit 110 decodes instructions forwarded by the decode unit 108 to determine if the instruction is a CR instruction, i.e., an instruction involving simply some manipulation of condition register bits. In step 10142, if it is a CR instruction, processing is preferably not affected, and is thus performed conventionally.

If the instruction decoded is not a CR instruction, in step 10143, the branch unit 110 determines if it is an MBRANCH instruction. In step 10144, when an MBRANCH instruction was identified in step 10143, the specific miss-bit to be compared for branching is identified. Cache record register subfield 305 of the MBRANCH instruction encoding may be used to identify the appropriate register in the cache record register set 200 containing the miss-bit. The memory access level identified in the memory level subfield 3042 may be used to further identify the specific miss-bit. In step 10145, the hit/miss subfield 3041 of the MBRANCH instruction is decoded to determine whether the branch is recommended on a hit or on a miss. In step 10146, if the instruction decodes as a branch on miss, the miss-bit identified in step 10144 is tested as being set or not set. If the miss-bit is set, indicating a miss (data not found) at a given memory level, flow control moves to step 10149, which implements a branch to the instruction at the target address specified in the address subfield 306. If the miss-bit is not set, the MBRANCH instruction processing is completed without branching to the identified target address.

If, in step 10145, the instruction decodes as a branch on hit, in step 10147, the miss-bit identified in step 10144 is tested as being set or not set. If the miss-bit is not set, indicating a hit (data found) at the appropriate memory level, and hence flow control moves to step 10149, which implements a branch to the instruction at the target address specified in the address subfield 306.

If, in step 10147, the miss-bit is set (data not found), the MBRANCH instruction processing is completed without branching to the identified target address.

If, in step 10143, the forwarded instruction is decoded as not being an MBRANCH instruction (implying a regular branch instruction), step 10148 is executed. Preferably, the present invention does not change the processing of non-MBRANCH branch instructions. Therefore, such instruction are processed in conventional fashion in steps 10148.

Referring again to FIG. 6, recall that in step 1016, the dispatch-execute unit 112 processes instructions, including the modified format memory access instruction 400 according to the present invention.

Referring now to FIG. 8, a method of performing the Dispatch and Execute (step 1016) of FIG. 6 including cache access with recording according to the present invention is now described. In step 10161, as is conventional, the dispatch-execute unit 112 analyses inter-instruction dependencies for instructions forwarded by the decode unit 108. Independent instructions are dispatched to a scheduler 116 for scheduling on functional units for execution. In step 10162, the dispatch-execute unit 112 determines whether an instruction execution involves D-cache 103-1 access. In step 10163, if there is a D-cache access involved, a further determination is made whether the cache access should be with recording or not. Cache access with recording means that the results of the cache access (hit or miss) is stored for subsequent processing. A detailed embodiment of a method for cache access with recording according to the present invention is described with reference to FIG. 9. The determination involved in step 10163 is simplified by the format modification of the memory access instruction in step 1005 according to the present invention. Alternatively, all memory instructions can be assumed to need cache access with recording.

Returning to FIG. 8, in step 10163, when D-cache access with recording is specified, step 10164 executes. In step 10(164, the cache record register 400 associated with the recording is identified by decoding the subfield 404 of the modified format memory instruction. Again note that in the special case, when an embodiment of this invention contains just one cache record register, explicit identification of the cache record register will be unnecessary. In step 10165, the cache record register identified may now be initialized by the cache management unit 102 to appropriate default settings of its sub-fields. Preferably, the default settings will imply a 'hit' at all memory levels. In step 10166, the d-cache is accessed with recording. If in step 10163, cache access is without recording, then conventional cache access is performed in step 10168. After d-cache access completes, i.e., in steps 10168 or 10166, the instruction is executed and completes as is conventional, in step 10167. If, in step 10162, the instruction execution does not require a d-cache access, the instruction is executed and completed, as is conventional, by the execute unit 112 and completion unit 114, in step 10167.

Recall that in FIG. 8, in step 10163, if there is a D-cache access involved, a further determination is made whether the cache access should be with recording or not. Cache access with recording means that the results of the cache access (hit or miss) is stored for subsequent processing. Recall also that when cache access is with recording, in step 10164, the cache record register is preferably initialized by the cache management unit 102 to a imply a 'hit' at all memory levels.

Figure 9:
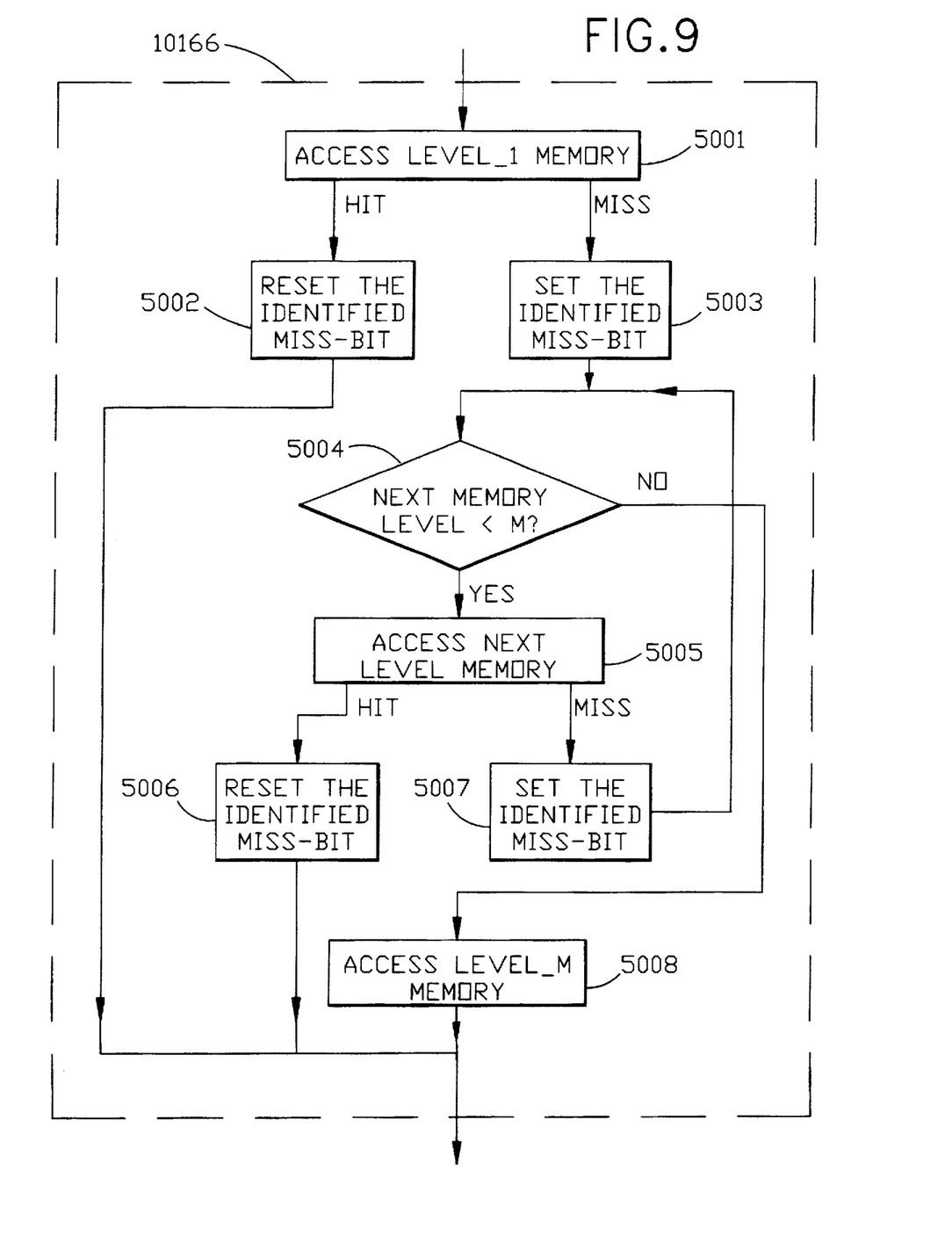
FIG. 9 illustrates the substeps associated with the Access cache with recording step of FIG. 8.

FIG. 9 describes in detail, step 10166 of FIG. 8 for performing cache access with recording in a multi-level cache memory 100-1 . . . 100-1 environment. In step 5001, cache access with recording begins by accessing the memory 100 at the lowest level 100-1 in memory hierarchy 100. If the cache access is a hit (data found), then step 5002 executes. In step 5002, the subfield corresponding to Level__1 in the cache record register identified in step 10164 is reset, and the cache access with recording (step 10166) completes. Else, if the access is a 'miss', the subfield corresponding to Level-1 in the cache record register identified in prior step 10164 is set, in step 5003. If the access in step 5001 is a 'miss', cache access with recording continues to step 5004. In step 5004, a check whether the next memory level is less than the highest (main storage) level of the memory hierarchy, i.e., 100-M. If the next memory level is determined in step 5004 to be less than M, the next memory level is accessed, in step 5005. If the access in step 5005 is a 'hit', the subfield corresponding to this level in the cache record register identified in prior step 10164 is set, in step 5006, and the cache access with recording (step 10166) completes. Else, if the access is a 'miss', the subfield corresponding to this level in the cache record register identified in prior step 10164 is set, in step 5007, and the processing continues with step 5004, described above. If, in step 5004, the next memory level is determined to be equal to M, the next memory level, i.e., level M is accessed, in step 5008. Since, this is the highest level of the memory hierarchy, we assume the access has to be a 'hit' and the cache access with recording (step 10166) completes.

While we have described our preferred embodiments of our invention, it will be understood that those skilled in the art, both now and in the future, may make various improvements and enhancements which fall within the scope of the appended claims. Accordingly, these claims should be construed to maintain the proper protection for the invention first disclosed.

We claim:

1. A computer-implemented method of generating memory access latency specific code sequences optimized for execution on a computer system having a hierarchical memory, comprising the steps of:

identifying a memory access instruction in a static code sequence;

generating a first memory access latency code sequence associated with the memory access instruction optimized for a hit at a level of the hierarchical memory and a second memory access latency code sequence associated with the memory access instruction optimized for a miss at the level of the hierarchical memory; and inserting an instruction for executing the first memory access latency specific code sequence when an execution of the memory access instruction causes the hit and the second memory access latency specific code sequence when an execution of the memory access instruction causes the miss.

2. A computer-implemented method as claimed in claim 1, further comprising the steps of:

generating a third memory access latency code sequence associated with the memory access instruction optimized for a hit at another level of the hierarchical memory and a fourth memory access latency code sequence associated with the memory access instruction optimized for a miss at said another level of the hierarchical memory; and inserting another instruction for executing the third memory access latency specific code sequence when an execution of the memory access instruction causes the hit at said another level and the fourth memory access latency specific code sequence when an execution of the memory access instruction causes the miss at said another level.

3. A computer-implemented method as claimed in claim 1, wherein said step of identifying further comprises the step of identifying the memory access instruction as a critical miss-point and wherein said step of generating is responsive to said step of identifying the memory access instruction as the critical miss-point.

4. A computer-implemented method as claimed in claim 1, further comprising the step of:

modifying the memory access instruction to identify a miss-bit for indicating whether the execution of the memory access instruction caused the miss; wherein said instruction for executing is responsive to the miss-bit.

5. A computer-implemented method as claimed in claim 1, wherein the instruction for executing comprises one of a branch-on-hit instruction for branching to the first memory access latency specific code sequence and a branch-on-miss instruction for branching to the second memory access latency specific code sequence.

6. A computer-implemented method as claimed in claim 1, wherein said computer system includes a compiler and said method steps are performed at compile-time.

7. A computer-implemented method of processing instructions and data in a computer system including a hierarchical memory and a static instruction sequence including a memory access instruction and associated memory access latency specific code sequences, each code sequence optimized dependent on an execution of the memory access instruction causing one of a hit or a miss at a level of the memory hierarchy, comprising the steps of:

decoding and executing the memory access instruction and storing information indicating whether said execution of the memory access instruction caused said hit or said miss; and branching to a cache hit optimized code sequence when the information indicates said hit and a miss optimized code sequence when the information indicates said miss, responsive to said step of storing.

8. A method as claimed in claim 7, wherein the memory access instruction is one of a load instruction, store instruction, and touch instruction.

9. A method as claimed in claim 7, wherein said step of storing further comprises the step of storing information indicating a level of the memory associated with said hit or miss wherein said step of branching is responsive to said level.

10. A method as claimed in claim 7, further comprising the step of identifying the memory access instruction as a critical miss-point; wherein the memory access latency specific code sequences are associated with the critical miss-point.

11. A method as claimed in claim 7, further comprising the steps of:

inserting a branch instruction associated with the memory access instruction; and decoding the branch instruction wherein said step of branching is responsive to said step of decoding the branch instruction.

12. A method as claimed in claim 11 wherein the branch instruction specifies a level of the memory upon which said step of branching is recommended.

13. A method as claimed in claim 7 wherein the hierarchical memory includes a multi-level cache memory and the computer system includes a register set wherein each register includes a plurality of sub-fields, each sub-field associated with a level of the multi-level cache memory.

14. A method as claimed in claim 13, wherein said step of storing information further comprises the steps of:

initializing the sub-fields to a default setting, responsive to said step of executing; and accessing a plurality of levels of the memory and recording the information in the sub-fields according to said hit and said miss at successive levels of the memory; wherein said step of branching is responsive to the information recorded in the sub-fields.

15. A method as claimed in claim 7, wherein said step of branching is optional in a given computer system implementation.

16. A method as claimed in claim 7 wherein instructions are executable using a single instruction sequencing control.

17. A program storage device readable by a computer, tangibly embodying a program of instructions executable by the computer to perform a compile-time optimized method of fetching instructions and data in a computer system including a cache memory, comprising the steps of:

identifying a memory access instruction in a static code sequence;

generating a first memory access latency code sequence associated with the memory access instruction optimized for a hit at a level of the hierarchical memory and a second memory access latency code sequence associated with the memory access instruction optimized for a miss at the level of the hierarchical memory; and inserting an instruction for executing the first memory access latency specific code sequence when an execution of the memory access instruction causes the hit and the second memory access latency specific code sequence when an execution of the memory access instruction causes the miss.

18. A program storage device readable by a computer, tangibly embodying a program of instructions executable by the computer to perform method steps as claimed in claim 17, wherein said step of identifying further comprises the step of identifying the memory access instruction as a critical miss-point and wherein said step of generating is responsive to said step of identifying the memory access instruction as the critical miss-point.

19. A program storage device readable by a computer, tangibly embodying a program of instructions executable by the computer to perform method steps as claimed in claim 17, further comprising the steps of:

modifying the memory access instruction to identify a miss-bit indicating whether the execution of the memory access instruction caused the miss; wherein said instruction for executing is responsive to the miss-bit.

20. A program storage device readable by a computer, tangibly embodying a program of instructions executable by the computer to perform method steps as claimed in claim 17, further comprising the steps of:

generating a third memory access latency code sequence associated with the memory access instruction optimized for a hit at another level of the hierarchical memory and a fourth memory access latency code sequence associated with the memory access instruction optimized for a miss at said another level of the hierarchical memory; and inserting another instruction for executing the third memory access latency specific code sequence when an execution of the memory access instruction causes the hit at said another level and the fourth memory access latency specific code sequence when an execution of the memory access instruction causes the miss at said another level.

21. A program storage device readable by a computer, tangibly embodying a program of instructions executable by the computer to perform method steps as claimed in claim 20, wherein the instruction for executing comprises one of a branch-on-hit instruction and a branch-on-miss instruction for branching to one of the memory access latency specific code sequences according to the hit or the miss at a specified level of the memory.

22. A program storage device readable by a computer, tangibly embodying a program of instructions executable by the computer to perform method steps as claimed in claim 17, wherein the memory access instruction is one of a load instruction, store instruction, and touch instruction.

23. A computer system for fetching of instructions and data stored in a memory wherein the instructions include a memory access instruction, the system including a hierarchical memory and a static instruction sequence including a memory access instruction and associated memory access latency specific code sequences, each code sequence optimized dependent on an execution of the memory access instruction causing one of a hit or a miss at a level of the memory hierarchy, the system comprising:

a processor, coupled to the memory, for fetching, decoding, and executing the instruction sequences;

the processor including:

means for storing information indicating whether the execution of the memory access instruction caused said hit or said miss; and branch logic, coupled to the memory, for branching to one of a hit optimized code sequence when said means for storing indicates said hit and a miss optimized code sequence when said means for storing indicates said miss.

24. A system as claimed in claim 23, wherein the memory access instruction is one of a load instruction, store instruction, and touch instruction.

25. A system as claimed in claim 23, wherein the memory access instruction includes a cache-record register field which identifies a register.

26. A system as claimed in claim 23 wherein the instructions are executable using a single instruction sequencing control.

27. A system as claimed in claim 23, wherein an execution of the branch logic is optional in a given computer system implementation.

28. A system as claimed in claim 23, wherein said means for storing further comprises means for storing information indicating a level of the memory associated with said hit or miss wherein said branch logic is responsive to said level.

29. A system as claimed in claim 28, further comprising:

means for generating a third memory access latency code sequence associated with the memory access instruction optimized for a hit at another level of the hierarchical memory and a fourth memory access latency code sequence associated with the memory access instruction optimized for a miss at said another level of the hierarchical memory; and the branch logic for branching to the third memory access latency specific code sequence when an execution of the memory access instruction causes the hit at said another level and the fourth memory access latency specific code sequence when an execution of the memory access instruction causes the miss at said another level.

30. A system as claimed in claim 23 further comprising means for identifying the memory access instruction as a critical miss-point; wherein the memory access latency specific code sequences are associated with the critical miss-point.

31. A system as claimed in claim 23, further comprising means for inserting a branch instruction for specifying one of the hit optimized code sequence when said means for storing indicates said hit and the miss optimized code sequence when said means for storing indicates said miss; and wherein said branch logic is responsive to the branch instruction.

32. A system as claimed in claim 31 wherein the branch instruction specifies a level of the memory upon which said branch logic is responsive.

33. A system as claimed in claim 23 wherein the hierarchical memory includes a multi-level cache memory and the computer system includes a register set wherein each register includes a plurality of sub-fields, each sub-field associated with a level of the multi-level cache memory.

34. A system as claimed in claim 23, wherein said means for storing information further comprises: a cache record register management unit for accessing a plurality of levels of the memory and recording the information in sub-fields according to said hit and said miss at successive levels of the memory; wherein said branch logic is responsive to the information recorded in the sub-fields.

35. A system as claimed in claim 23, further comprising a cache-record register set which is part of a register file including architecturally visible registers.

* * * * *